United States Patent
Chen et al.

(10) Patent No.: US 12,028,834 B2
(45) Date of Patent: Jul. 2, 2024

(54) RESOURCE CONFIGURATION AND SELECTION FOR DEVICE-TO-DEVICE LINKS

(71) Applicant: ZTE Corporation, Guangdong (CN)

(72) Inventors: Lin Chen, Guangdong (CN); Wei Luo, Guangdong (CN); Mengzhen Wang, Guangdong (CN); Boyuan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 349 days.

(21) Appl. No.: 17/403,467

(22) Filed: Aug. 16, 2021

(65) Prior Publication Data

US 2022/0015070 A1 Jan. 13, 2022

Related U.S. Application Data

(63) Continuation of application No. PCT/CN2019/075137, filed on Feb. 15, 2019.

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01);
(Continued)

(58) Field of Classification Search
CPC . H04W 72/02; H04W 72/0453; H04W 72/23; H04W 72/0446; H04W 72/1263; H04W 92/18
See application file for complete search history.

(56) References Cited

U.S. PATENT DOCUMENTS 10,440,689 B2  10/2019  Van Phan et al.
11,197,269 B2*  12/2021  Zhang ............... H04W 74/006
(Continued)

FOREIGN PATENT DOCUMENTS

CN  107409380 A  11/2017
WO  2017027375 A1  2/2017
(Continued)

OTHER PUBLICATIONS

Partial European Search Report for EP Patent Application No. 19849747.1, dated Sep. 15, 2022, 17 pages.
(Continued)

*Primary Examiner* — Chandrahas B Patel
(74) *Attorney, Agent, or Firm* — Perkins Coie LLP

(57) ABSTRACT

Methods, systems, and devices for resource configuration and selection for device-to-device links in mobile communication technology are described. An exemplary method for wireless communication includes receiving, by a wireless device from a network node, a configuration for multiple resource pools that are associated with a carrier set, selecting, based on the configuration, a resource from the multiple resource pools, and performing, using the resource, a device-to-device link communication. Another exemplary method for wireless communication includes receiving, by a wireless device from a network node, a configuration for multiple resource pools that are associated with a carrier set, receiving, from the network node, a dedicated resource, and performing, using the dedicated resource, a device-to-device link communication.

17 Claims, 4 Drawing Sheets

(51) Int. Cl.
  *H04W 72/0453* (2023.01)
  *H04W 72/1263* (2023.01)
  *H04W 72/23* (2023.01)
  *H04W 72/543* (2023.01)
  *H04W 92/18* (2009.01)

(52) U.S. Cl.
  CPC ....... *H04W 72/1263* (2013.01); *H04W 72/23* (2023.01); *H04W 72/543* (2023.01); *H04W 92/18* (2013.01)

(56) References Cited

U.S. PATENT DOCUMENTS

| | | | |
|---|---|---|---|
| 11,219,042 B2* | 1/2022 | Lin | H04L 5/0091 |
| 11,425,543 B2* | 8/2022 | Kang | H04W 76/14 |
| 2018/0255558 A1 | 9/2018 | Lee et al. | |
| 2022/0061055 A1* | 2/2022 | Freda | H04W 72/53 |

FOREIGN PATENT DOCUMENTS

| | | |
|---|---|---|
| WO | 2018/030825 A1 | 2/2018 |
| WO | 2018/055813 A1 | 3/2018 |
| WO | 2018/171509 A1 | 9/2018 |
| WO | 2019022477 A1 | 1/2019 |

OTHER PUBLICATIONS

Huawei et al., "Bandwidth Parts and Resource Pools for V2X sidelink," 3GPP TSG RAN WG1 Meeting #95, R1-1813555, Spokane, USA, Nov. 12-16, 2018, 12 pages.
EPO, Extended European Search Report for European Application No. 19849747.1, mailed on Dec. 16, 2022, 15 pages.
International Search Report and Written Opinion mailed on Jun. 27, 2019 for International Application No. PCT/CN2019/075137, filed on Feb. 15, 2019 (8 pages).

* cited by examiner

610 ⟶

```
┌─────────────────────────────────────────────────┐
│ Receiving, by a wireless device from a network  │
│ node, a configuration for multiple resource     │──── 612
│ pools that are associated with a carrier set    │
└─────────────────────────────────────────────────┘
                        │
┌─────────────────────────────────────────────────┐
│ Receiving, from the network node, a dedicated   │──── 614
│ resource                                        │
└─────────────────────────────────────────────────┘
                        │
┌─────────────────────────────────────────────────┐
│ Performing, using the dedicated resource, a     │──── 616
│ device-to-device link communication             │
└─────────────────────────────────────────────────┘
```

FIG. 6B

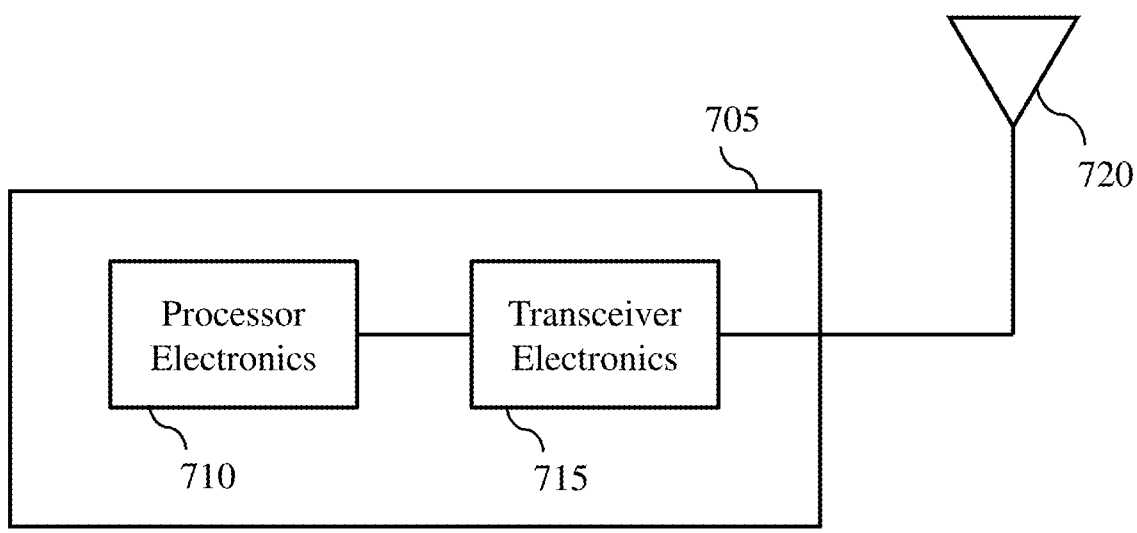

FIG. 7

RESOURCE CONFIGURATION AND SELECTION FOR DEVICE-TO-DEVICE LINKS

CROSS-REFERENCE TO RELATED APPLICATIONS

This application is a continuation of and claims priority to International Patent Application No. PCT/CN2019/075137, filed on Feb. 15, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement resource configuration and selection for device-to-device links.

SUMMARY

This document relates to methods, systems, and devices for generating sequences for reference signals in mobile communication technology, including 5th Generation (5G) and New Radio (NR) communication systems.

In one exemplary aspect, a wireless communication method is disclosed. The method includes receiving, by a wireless device from a network node, a configuration for multiple resource pools that are associated with a carrier set, selecting, based on the configuration, a resource from the multiple resource pools, and performing, using the resource, a device-to-device link communication.

In another exemplary aspect, a wireless communication method is disclosed. The method includes receiving, by a wireless device from a network node, a configuration for multiple resource pools that are associated with a carrier set, receiving, from the network node, a dedicated resource, and performing, using the dedicated resource, a device-to-device link communication.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 6A and 6B show examples of wireless communication methods, in accordance with some embodiments of the presently disclosed technology.

FIG. 7 is a block diagram representation of a portion of an apparatus, in accordance with some embodiments of the presently disclosed technology.

DETAILED DESCRIPTION

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

V2X is a predefined communication protocol and data exchange standard. It may be implemented in a variety of scenarios, which include vehicle to vehicle (V2V), vehicle to pedestrian (V2P) and vehicle to infrastructure (V2I), and is enabled to perform wireless communication and information exchange. Based on V2X technology, a vehicle can operate in safer driving conditions, be better able to traverse traffic, and provide its passengers with improved convenience and entertainment.

Figure 1:
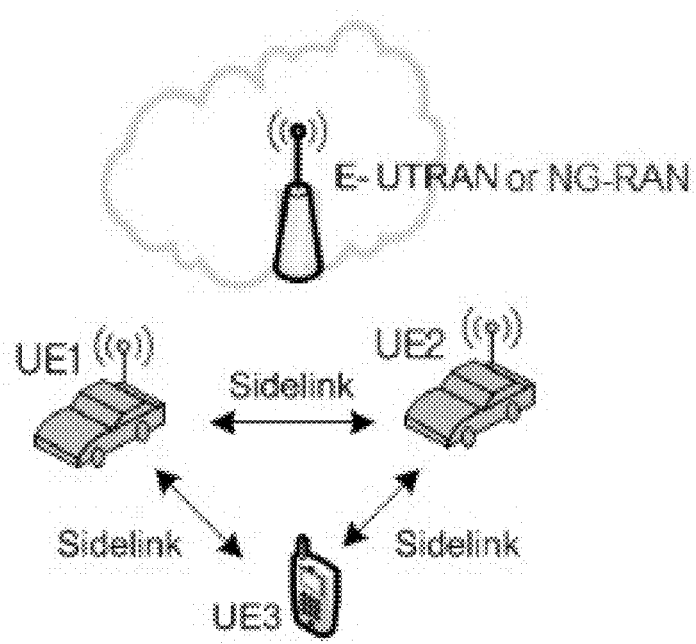
FIG. 1 shows an example of V2X device-to-device communication and discovery.

Currently, there are various V2X technologies that include C-V2X, which is based on LTE technology, and DSRC-V2X, which is based on Wi-Fi technology. For C-V2X, the current implementation deploys User Equipment (UE) communication on a device-to-device link (also referred to as a sidelink), wherein the data traffic is not routed from the eNB and core network, but is directly transmitted from source UE to destination UE. This kind of V2X communication method is referred to as PC5-based V2X or V2X sidelink communication, as shown in FIG. 1.

With the development of technology and automation industry, the use case of V2X communication is being expanded and the performance requirement becoming stricter. The advanced V2X service may be categorized several types: vehicle platooning, extended sensors, semi-automated or full-automated driving, as well as remote driving. In order to achieve better performance, the supported packet size ranges from 50 bytes to 12000 bytes, the supported transmission rate ranges from 2 messages per second to 50 messages per second, the supported end-to-end delay ranges from 3 ms to 500 ms, the supported transmission reliability ranges from 90% to 99.999%, the supported data rate ranges from 0.5 Mbps to 1000 Mbps, and the supported transmission range is between 50 meters and 1000 meters.

Figure 2:
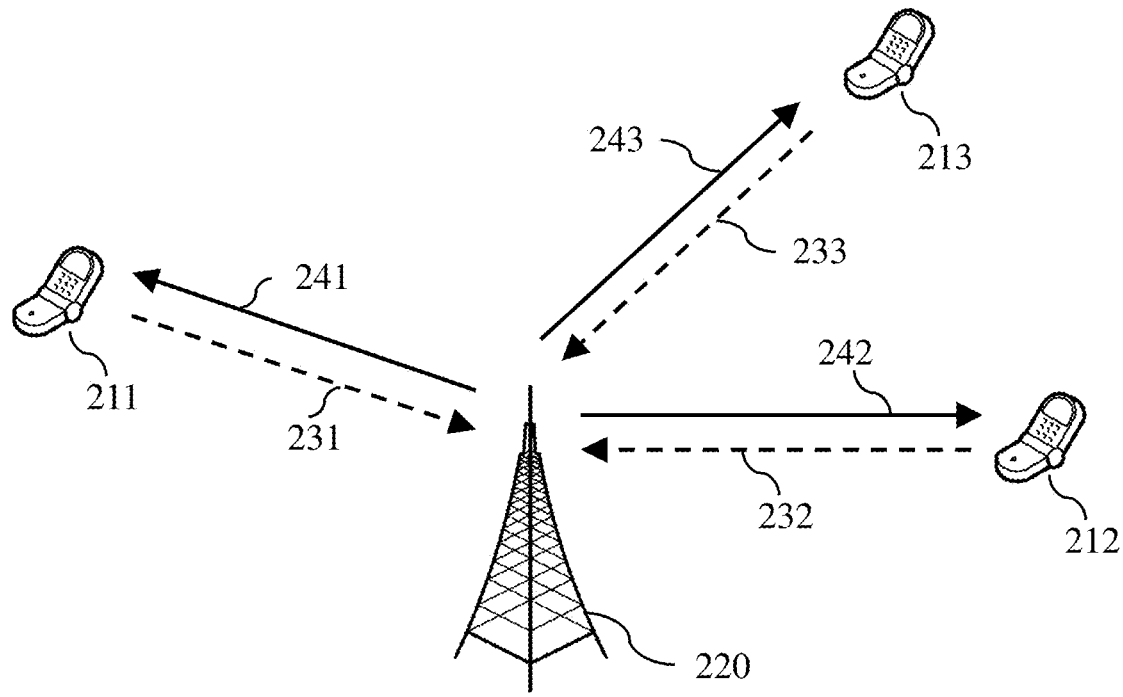
FIG. 2 shows an example of a base station (BS) and user equipment (UE) in wireless communication, in accordance with some embodiments of the presently disclosed technology.

Embodiments of the disclosed technology provides methods and systems for carrier selection and reselection, resource pool selection and reselection, as well as resource selection and reselection. FIG. 2 shows an example of a wireless communication system (e.g., an LTE, 5G or New Radio (NR) cellular network) that includes a BS 220 and one or more user equipment (UE) 211, 212 and 213. In some embodiments, the uplink transmissions (231, 232, 233) include an identity of the UE, which is received by the BS 220 that transmits (241, 242, 243) configurations of multiple resource pools that may be used by the UEs for subsequent communications. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Overview of Sidelink Resource Configuration and Selection

In some existing implementations (e.g., TS 36.321), a UE performs carrier selection (reselection) before normal V2X sidelink communication. In other existing implementations (e.g., Rel-15 V2X), PC5 carrier aggregation is supported, and the UE is capable of selecting multiple carriers.

For carrier selection (reselection), the MAC entity should first determine whether there is buffer data in each logical channel. For the carriers associated with each logical channel, if its channel busy ratio (CBR) is below the threshCBR-FreqReselection corresponding to the priority level which is associated with each logical channel, then the carrier can be regarded as the candidate carrier for this corresponding logical channel. If the carrier reselection is triggered by MAC entity, then for each logical channel which buffers data for transmission, it will select a carrier and its association resource pool, if the CBR is below the threshCBR-Freq-Keeping associated with the priority which is corresponding to the logical channel. Otherwise, for each carrier configured by upper layer, if the CBR is below the threshCBR-FreqReselection corresponding to the priority level which is associated with the logical channel, the carrier can be regarded as the candidate carrier. If there are more than one carriers in the candidate carrier set, then for each logical which buffers data for transmission, it will follow the CBR order that is from low to high, to select the carrier(s). The number of carriers that are selected is based on the UE implementation.

In some embodiments, the carrier selection mechanism in LTE V2X depends on two factors: (1) the available carrier set which is binding to the service type of transmission data, and (2) the comparison between CBR measurement value and configured CBR threshold value which is associated with different priority level.

In some embodiments, for each selected carrier, there might be multiple configured mode 2 resource pools. The UE may further select one resource pool for the following resource selection. For example, if zoneConfig is present in the configuration, the UE should use its geo-location to select an appropriate resource pool. Otherwise, the UE may only refer to the synchronization resource type to select the resource pool.

After the completion of carrier selection and resource pool selection, the UE should perform resource selection based on its own transmission period, number of re-transmission time, number of subchannels, and other parameters. Next, the UE may select an appropriate MCS. Then, the UE can forward the configured sidelink grant, HARQ information and the involved logical channel's priority to the HARQ entity. The sidelink HARQ entity should retrieve MAC PDU following every sub-frame, every sidelink process from MAC entity. Then the HARQ entity should forward the MAC PDU, sidelink grant, as well as HARQ information to each sidelink process, and indicate the sidelink process to initiate sidelink transmission. Furthermore, during the sidelink transmission, the sidelink process should also consider the impact of UL/SL prioritization. If there is a conflict between UL transmission and SL transmission, then the sidelink process should determine whether the sidelink priority is high enough to allow transmission.

In some embodiments, the allocated UL/SL grant usually cannot support all data transmissions for every logical channel. Therefore, the UE should follow the priority level among each logical channel, to perform multiplexing, as well as to assemble the MAC PDU. For each logical channel, a guaranteed data rate may be defined. Only if the guaranteed data rate can be satisfied for each logical channel, can the extra resources be allocated via different priorities. In NR, and based on various transmission durations and service types, the LCP can be divided in to two following steps, after the UE receives the UL grant:

1) The UE should determine which logical channel deserve to use this grant, wherein every logical channel should be linked with one or more of a set of allowed subcarrier spacing, a maximum PUSCH duration, an indication of which configured grant type can be used for which transmissions, or a set of serving cells.

2) The UE should focus on how to allocate resource among those qualified logical channels.

Exemplary Embodiments for Sidelink Resource Configuration and Selection

In accordance with the presently disclosed technology, an exemplary embodiment for sidelink resource configuration and selection includes the following steps:

1) A UE can report to gNB, with its identity indication, via sidelinkUEInformation.

a) In some embodiments, the identity indication can be a one bit field, which informs the gNB that it is special UE. If the UE is a special UE, then this bit will be set as 1; otherwise, if it is a normal UE, then it will be set as 0.

b) In other embodiments, the identity indication may be an optional field. For example, if the UE is a special UE, then this field will be present in sidelinkUEInformation; otherwise, if it is a normal UE, then this field will be absent in sidelinkUEInformation.

In some embodiments, a UE may report at least one of the following via sidelinkUEInformation:

a) A request for dedicated groupcast resources,
   b) A size of the requested resource pool, and
   c) A number of scheduled UEs.

Figure 3:
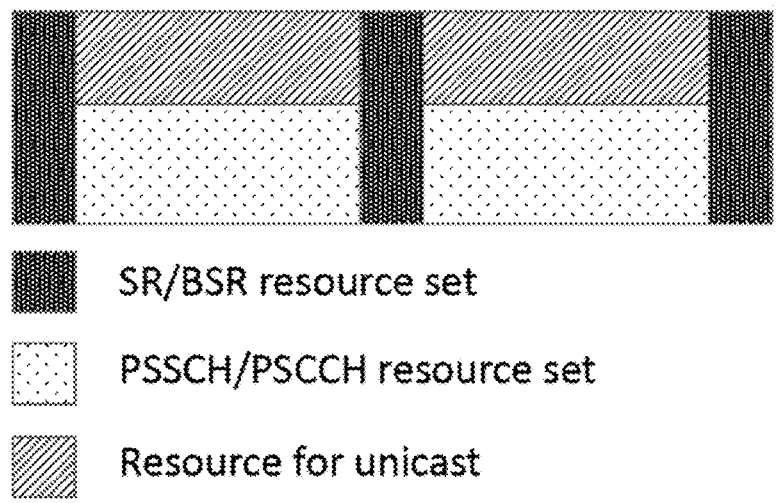
FIG. 3 shows an example of a dedicated resource pool configuration.

2) After reporting the identity indication, a special UE will receive a dedicated resource pool configuration, from gNB, which will not overlap with the normal mode 2 resource pool. An example of the resource pool configuration is shown in FIG. 3.

In some embodiments, the dedicated resource pool configuration can include at least one of the following:

The gNB id, to indicate which gNB provide this resource pool configuration
   Time-domain indication of the resource location Frequency-domain indication of the resource location
Number of subchannels
Resource reservation period
Transmission parameters
Reception parameters
CBR configuration with different packet priorities
SR and/or B SR resource set In some embodiments, and for e.), f.) can also be configured by the special UE. In an example, the gNB can indicate whether the UE has the right to configure e.) and f.). In some embodiments, this indication can be:
 a) Implicit; if gNB does not configure transmission parameter and/or reception parameter, then the special UE knows that it needs to do the configuration on its own.
 b) Explicit; the gNB can set a switch to control whether the special UE can have rights to configure those parameters In some embodiments, the parameters e.) and f.) can be configured by both the gNB and the special UE. In an example, the gNB can provide a suggested value range, and then the special UE can further configure an exact value within this range.

In some embodiments, the special UE can be a group header UE or a relay UE. In an example, this special UE indication should include a destination ID and a cast type indication.

3) In some embodiments, and in this step, a UE can provide mode 2 resource pool information to other UEs for their autonomous resource selection and/or scheduling resource selection, in the following two scenarios:
 a) In the sidelink relay scenario, the UE should be in-coverage, and can forward the SIB broadcasted mode 2 resource configuration (received from the gNB) to other UEs who are out of coverage or under poor coverage situation. These UEs can use the resource pool for transmission and reception.
 b) In the groupcast scenario, the UE is a group header UE, and gNB allocates a particular resource pool for this group only. The header UE will forward the resource pool configuration to other member UEs. Then both member UEs and header UE share the same resource pool.

In some embodiments, the header UE can indicate a set of dedicated resources for member UEs, which are allocated for member UE's SR and/or BSR transmissions towards the header UE. Member UEs will sense for available SR and/or BSR resources within the resource pool, and send SR and/or BSR towards header UE.

In some embodiments, a member UE should report the resource pool configuration provided by header UE, to its gNB if it is controlled by different gNB from the header UE's gNB.

Figure 5:
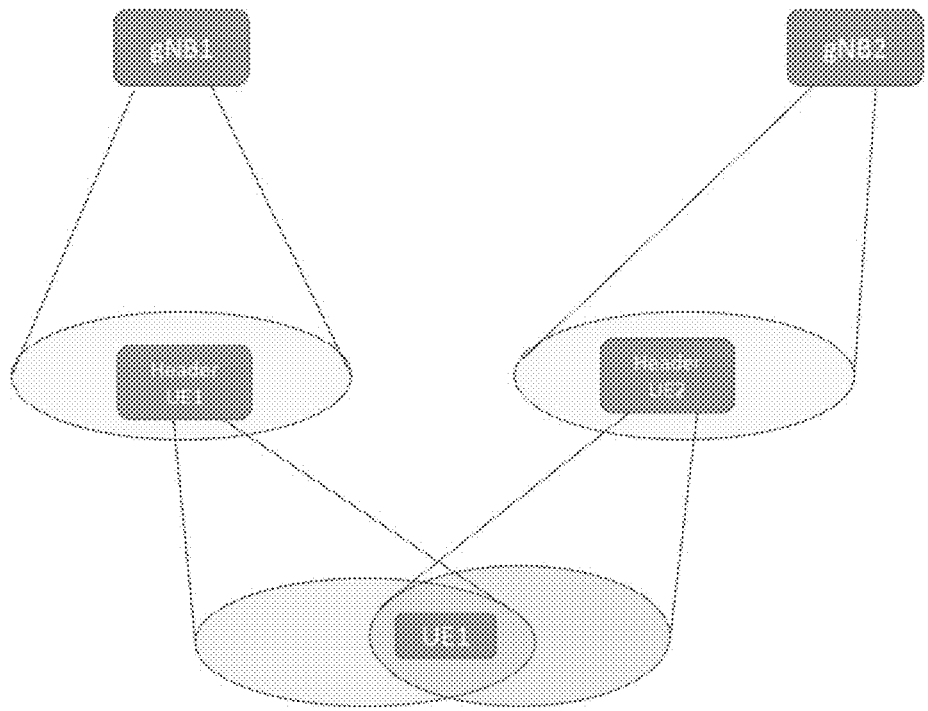
FIG. 5 shows an example of a UE concurrently controlled by multiple header UEs.

In some embodiments, a member UE should report the resource pool configuration provided by one of its header UEs, towards other header UEs, if it is controlled by multiple header UEs. In an example, and as shown in FIG. 5, each header UE's gNBs may be different.

In some embodiments, and when a member UE receives multiple sidelink grants from multiple header UEs or a gNB, and these sidelink grants are on the same frequency and overlapped on in the time domain, then the UE should only keep one sidelink grant, according to the packet priority level of different data traffic.

Figure 4:
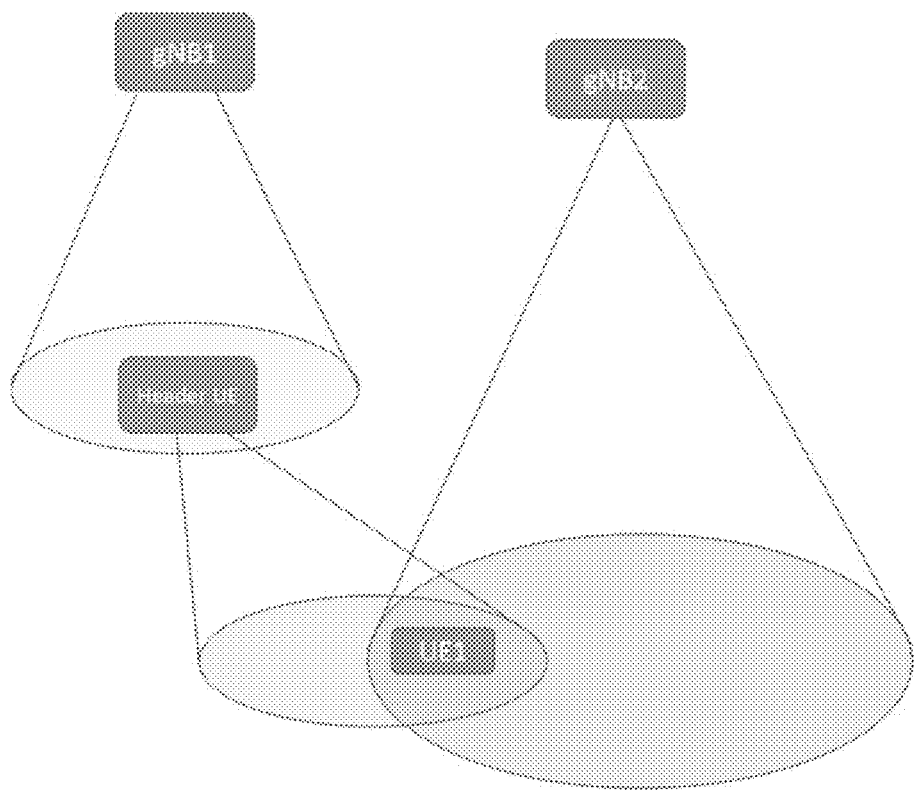
FIG. 4 shows an example of a UE concurrently controlled by a header UE and gNB.

In some embodiments, a header UE can indicate a set of dedicated resources for member UEs, using for the unicast connection between header UE and each member UE, as shown in FIG. 4.

In some embodiments, this UE can provide such mode 2 resource pool information through groupcast communication, and/or setup PC5 RRC connection with other UEs respectively, then send the mode 2 resource pool information through PC5 RRC dedicated signaling.

Examples of NR V2X Carrier Selection

Unicast scenario: 1) The NAS layer can configure a mapping relationship between each destination ID and a carrier set (which is referred to as a potential carrier set).

2) After a unicast connection is set up between two UEs, these two UEs can negotiate (either transmitted from UE2 to UE1, or transmitted from UE1 to UE2) a using carrier set, from the potential carrier set, based on at least one of the following information:
 The capability of band combination between two UEs.
 Synchronization carriers and synchronization resource type.
 The packet priority or service type priority
 CBR of each carrier
 QoS requirement, such as data rate or data reliability.
 The above parameters and concurrent with carriers for transmission and reception of other services.

Groupcast scenario: 1) The NAS layer can configure a mapping relationship between each destination ID and a carrier set (which is referred to as a potential carrier set).

2-1) In some embodiments, a group header can take charge of carrier selection.

2-2) In other embodiments, a gNB can take charge of carrier selection based on the information reported by the group header, and then configure the selected carrier set for the header UE. The information reported by the group header should include at least one of the following:
 The CBR measurement according to its sensing or the CBR measurement result reported by other member UEs.
 The packet priority of the groupcast service.
 The QoS requirement, such as data rate and data reliability.
 The band combination capability reported by each of its member UEs.

3) The group header should forward the mapping relationship between each LCID and its associated carrier set, to its member UEs when packet duplication is activated by the header, via groupcast communication or PC5-RRC dedicated signaling. In some embodiments, the group member that activates packet duplication should forward the mapping relationship between each LCID and its associated carrier set to its header UE and other member UEs, via groupcast communication.

Examples of NR V2X Resource Pool Selection

1) In mode 2, a UE can select resources from one or more resource pools, based on an amount of its buffered data, as well as on at least one of the following parameters configured by gNB, or pre-configured:
 Information of zone-location
 Comparison between CBR and CBR threshold with different packet priority
 Synchronization resource type
 Casting type
 QoS requirement such as data rate and data reliability 2) In the groupcast scenario, a group header can select at least one resource pool, and forward the resource pool information towards its member UEs, through groupcast communication or PC5-RRC dedicated signaling, after setting up PC5 connection with each of its member UEs.

3) In some embodiments, the V2X UE can be configured with multiple types of resources, which may include at least one of the following:

NR configured grant type 1,
NR configured grant type 2,
A mode 1 resource pool, wherein the gNB will allocate a resource for this UE from within this resource pool,
A mode 2 resource pool, wherein this UE will autonomously select a resource from within this resource pool,
A mode 2d resource pool, wherein a UE can schedule this mode 2 UE using a resource from within this resource pool,
A dynamic resource pool, wherein a UE can perform a one-shot transmission using a resource from within this resource pool,
An SPS resource pool, wherein a UE can perform SPS scheduling using a resource from within this resource pool.

In some embodiments, the resource pool configuration can include at least one of the following parameters:

The resource periodicity
The resource timing offset
The resource location in the time domain
The resource location in the frequency domain
The antenna port configuration of the resource
The allowed MCS range when using the resource
An indication of whether current resource pool is allowed for sensing
A CBR threshold with different packet priority/packet delay budget In some embodiments, and for each type of resource, the gNB can determine whether it is allowed to use what is specified in its configuration. In an example, this configuration can be defined as follow.

The gNB can configure a resource type list, which will include all available resource types that gNB can configure for UEs.
The gNB can configure a resource type list and use a bitmap to indicate those available resource types that gNB can configure for UEs.
For each type of resources, the gNB can use a boolean parameter to indicate whether each type of resource is allowed to be used, even it has already been configured.
Implicitly, the gNB does not have a configuration for a certain type of resource.

4) In some embodiments, an NR V2X UE can use an exceptional resource pool according to a gNB's configuration in at least one of the following scenarios:

When a UE's traffic data of SPS service and one-shot transmission are in different resource pools, and the one-shot transmission has completed short sensing, then the UE can be allowed to use the one-shot transmission resource pool for SPS traffic transmission, if the SPS sensing result is not available.
When the UE is configured with both configured grant type 1 and configured grant type 2, and RLF is detected, then UE can be allowed to transmit aperiodic data traffic with configured grant type 1 or configured grant type 2.

In some embodiments, the two configured grant type can be both configured to UE at the same time, and in those scenarios:

The gNB transmits DCI to the UE, and there is a unified index to indicate which configured grant is activated
The gNB should configure the UE with different SL-CS-RNTI, e.g., SL-CS RNTI1 used for configured grant type 1 and SL-CS-RNTI2 used for configured grant type 2
When the UE's sensing result is not available in mode 2 resource pool. In this case, the UE is allowed to use configured grant type 1 or configured grant type 2. Furthermore, when the UE's mode 1 resource is temporary unavailable, then the UE is allowed to use the mode 2 dynamic resource pool.

For these scenarios, the UE can also be configured with an exceptional resource pool for mode 1 or mode 2. Also, the UE can be configured with an exceptional configured grant.

Examples of NR V2X Resource Selection

Broadcast scenario: When a UE's MAC entity is performing resource selection or reselection, it should consider the following factors and report to lower layer:

1) The UE's MAC entity should select, based on the sensing result, a set of sidelink resources, corresponding to different beam directions for beam sweeping for one MAC PDU transmission. When supporting ARQ, the re-transmission resource should be a set of sidelink resource corresponding to different beam directions, which can be used for beam sweeping.

2) To support beam sweeping, a UE should be configured with a data burst periodicity for sidelink communication, by the gNB, which indicates the time length for one round of beam sweeping.

3) In order to configure the number of beams used for transmission, a UE should be configured with a data block number.

4) Alternatively, this data block number and data burst periodicity can be configured with multiple combinations, corresponding to the same data burst, but for different sub-carrier spacings and different data SPS periodicity configurations.

5) Alternatively, the UE can request resources corresponding to:

A specific TX profile
A scheduling mode
Whether a resource is configured grant type 1 or configured grant type 2

6) Alternatively, when the UE receives a gNB's activation or deactivation of a certain configured grant type 2 resource, it can send SL configured grant confirmation MAC CE. An example MAC CE can include:

The corresponding LCID
One or more configured grant type 2 indexes

Groupcast scenario: When a UE's MAC entity is performing resource reselection, it should consider the following factors, and report to lower layer:

1) If the UE is a header UE, then it should first sense the location of all its member UEs, and choose a set of beam directions based on the location information, and then use the resources corresponding to the chosen beams for packet transmission.

2) To support beam sweeping, a UE should be configured with a data burst periodicity for sidelink communication, from the gNB, which indicates the time length for one round of beam sweeping.

3) In order to configure the number of beam used for transmission, a UE should be configured with a data block number.

4) Alternatively, this data block number and data burst periodicity can be configured with multiple combinations, corresponding to the same data burst, but for different sub-carrier spacing and different data SPS periodicity configurations.

Unicast scenario: During sidelink discovery, since the transmitter and receiver can negotiate the transmission beam, beam sweeping does not need to be introduced in unicast. When UE's MAC entity doing resource reselection, it should consider the following factor, and report to lower layer:

1) The UE should select a sidelink grant according to a sensing result for one MAC PDU transmission. If the traffic is SPS, then UE should select a SPS resource grant.

Examples of NR V2X Logical Channel Prioritization (LCP)

1) The MAC entity shall perform the following logical channel prioritization procedure for each SCI corresponding to a new transmission in V2X sidelink communication:

The MAC entity shall select a logical channel which can fulfill the following requirements for every SL grant:

If the allowed carrier set is configured, then the allowed carrier set associated to the selected logical channel shall include the carrier associated to the SL grant.

If the allowed RAT type is configured, then the allowed RAT associated to the selected logical channel shall include the RAT associated to the SL grant.

If the allowed cast type is configured, then the cast type associated to the selected logical channel shall be the same or shall include the cast type associated to the SL grant.

If the allowed resource type is configured, then the allowed resource type associated to the logical channel shall include the resource type associated to the SL grant.

If the allowed SCS or SCS list is configured, then the SCS or SCS list associated to the selected logical channel shall be the same or shall include the SCS or SCS list associated to the SL grant.

2) For a connected UE, the following methods can be used to handle the mapping between QoS and logical channel:

a) In some embodiments, a UE can report QoS flow information and characteristics to the gNB. Then the UE can be configured with variety of SL logical channels, as well as an SDAP mapping rule.

In an example, the UE can report the traffic pattern and relevant QoS parameters to the gNB and using SidelinkUEInformation. Then, the UE can be configured with different logical channels by gNB.

In another example, the configuration can include the mapping between the QoS index to certain logical channel and the mapping between logical channels and logical channel groups.

In yet another example, and for each logical channel, the gNB can further configure the available SCS, maximum PSSCH duration, whether the configured grant type 1 is allowed on this logical channel, whether the configured grant type 2 is allowed on this logical channel, and whether mode 1 and/or mode 2 is allowed on this logical channel. Furthermore, an indication for whether duplication can be activated when using the logical channel, can be configured. If this indication is configured, then gNB shall configure two carrier sets.

In yet another example, and for every sidelink logical channel, it can be bound with at least one of the following parameters:

Priority level
Allowed SCS or SCS list
Allowed carrier set
Allowed cast type
Allowed RAT (Radio Access Technology) type
Allowed resource type
A scheduling mode, which can map to different logical channel groups
An indication for whether dynamic scheduling is allowed on this logical channel b) In some embodiments, the UE can map QoS flow to different parameters, with the assistance information configured by gNB, to create corresponding logical channels and perform SDAP mapping. In an example, the assistance information can include at least one of the following:

A mapping relationship between PDB and maximum PSSCH duration, as well as the SCS;
A threshold for the priority level or PDB, which is used for determining the mapping between priority level and different resource types
A threshold for Packet Error Rate (PER) or reliability level, which is used for determining the triggering of RLC AM and/or PDCP duplication
A mapping between LCGID and the priority level
A mapping between LCGID and the scheduling mode In an example, the gNB can configure the mapping between LCGID to mode 1 traffic's QoS only, or it can configure the mapping between LCGID to mode 2 traffic's QoS only.

Based on the assistance information, the UE could map different QoS flow to the corresponding maximum PSSCH duration, SCS and resource type, as well as determine whether to trigger RLC AM, packet duplication, model, or mode 2. Then, the UE could create the associated logical channel and perform SDAP mapping. Furthermore, when the UE reports BSR, it should report additional information like SCS and maximum PSSCH duration. In some embodiment, the following alternatives may be followed:

The UE could include the SCS and maximum PSSCH duration indication within BSR with the addition of an extra field.
The UE could configure the mapping relationship between LCGID and SCS and/or maximum PSSCH duration and report it to gNB in advance.
For every connected UE, the gNB may configure the mapping between LCGID and QoS index with the granularity of per destination ID.

c) In some embodiments, the gNB can configure the mapping relationship between VQI (PDB or priority level) and the corresponding PDCP/RLC/MAC parameters. Based on the QoS characteristics reflected in the upper layer from the packet, the UE can use the corresponding PDCP/RLC/MAC parameter. In an example, the parameter can be at least one of the following:

PDCP: discard Timer/statusReportRequired/PDCP-SN-Size/DataSplitThreshold/statusPDB-Periodicity/t-Reordering/rn-IntegrityProtection/DataSplitDRB/DataSplitThreshold/outofOrderDelivery/pdcp-DuplicationSRB
RLC: t-PollRetransmit/pollPDU/pollByte/maxRetxThreshold/t-Reordering/t-StatusProhibit/am-WithShortSN/um-WithShortSN/um-WithLongSN
MAC: LCP-Restriction/recommendedBitRate/logicalChannelSR-DelayTimer/multipleSR-Configurations/multipleConfiguredGrants Examples of Uplink/Sidelink Prioritization When a UE has concurrent SL grant(s) and UL grant(s) for transmission, and if using all the grants is beyond the UE's capability, then the UE should follow SL/UL prioritization to use some of the grants.

0) Prioritization rule between NR UL and NR SL. If the sidelink logical channel is configured with different prioritization, like the NR Uu logical channel prioritization, then:
   a) Directly compare the prioritization between SL MAC PDU and UL MAC PDU (the priority would be the priority of the highest priority logical channel)
   b) The gNB will configure a threshold of SL logical channel if the priority of SL MAC PDU or SL LCH is greater than or equal to the threshold, and then the SL MAC PDU transmission would be prioritized; otherwise the UL MAC PDU transmission would be prioritized.
   c) The gNB will configure a PC5 QFI list; if the list includes the QFI of the SL MAC PDU, then the SL MAC PDU transmission would be prioritized; otherwise the UL MAC PDU transmission would be prioritized. In some embodiments, and according to the mapping between SLRB/SL LCH and the QFI, the UE will know how to use a specific SL LCH to transmit the data with the corresponding QFI. Furthermore, and based on whether the SL MAC PDU includes the data of the specific SL LCH, the UE will know whether the SL MAC PDU includes the data of the QFI within the configured QFI list.
   d) If SL LCH is associated to 5QI/VQI/QoS index, then the gNB will configure a 5QI list. In this case, the SL MAC PDU transmission would be prioritized if the SL MAC PDU includes the data corresponding to the 5QI within the configured list.
1) Prioritization rule in the cross-RAT use case.
a) Considering the prioritization between NR UL and LTE SL, the gNB will configure the PPPP threshold of LTE SL. In this case, if the PPPP of current SL MAC PDU is higher than a threshold, then the SL MAC PDU transmission would be prioritized; otherwise the UL MAC PDU transmission would be prioritized.
b) When a prioritization problem occurs between NR UL, LTE SL and NR SL transmissions (considering that LTE SL and NR SL would be non-co-channel, the problem would only occur in the case that prioritization between NR UL and LTE/NR SL if NR UL would be co-channel with NR/LTE SL), then the gNB will configure a threshold for both NR SL and LTE SL. If both NR SL and LTE SL transmission can be prioritized, then an IDC problem is encountered.
c) When a prioritization problem occurs between NR UL, LTE SL and NR SL transmissions (considering that LTE SL and NR SL would be non-co-channel, the problem would only occur in the case that prioritization between NR UL and LTE/NR SL if NR UL would be co-channel with NR/LTE SL), and if the UE is capable of fulfilling the transmission, then based on condition b.), the UE will also transmit SL MAC PDU.
d) Considering the prioritization between LTE UL and NR SL, the eNB can configure the transmission criteria of NR SL, similar to condition a.), or the eNB can configure the mapping between Uu logical channel priority and NR sidelink logical channel priority/PC5 5QI/QoS index.
2) Prioritization rule in the dual-connectivity scenario. In some cases, the UE can connect to both MeNB and SgNB, and also be enabled to perform an SL transmission. Herein, if there is a transmission collision between UL (LTE UL or NR UL) and SL (LTE SL or NR SL), the gNB can configure the transmission criteria for LTE SL or NR SL, as mentioned above, or MN can configure a different SL transmission criteria compared with SN configured SL transmission criteria.
3) Prioritization rule within dual mode transmissions (e.g., mode 1 and mode 2). Since mode 1 SL V2X transmission and UL transmission are both under gNB scheduling, only mode 1 SL transmission and mode 2 SL transmission would collide with each other. In this case:
   a) The gNB can explicitly indicate which mode is has a higher priority.
   b) The gNB will configure a 5QI/VQI/QoS index list for mode 2; if the mode 2 SL MAC PDU contains the data of 5QI within the configured list, then mode 2 SL transmission will be prioritized; otherwise the mode 1 SL transmission is prioritized.
   c) The UE can directly compare the 5QI/VQI/QoS/Default Packet Priority between mode 1 transmission and mode 2 transmission.
4) Prioritization rule if a gap for frequency switch is not configured.

Herein, the gNB can configure a threshold for SL QoS and/or Packet Priority Level and/or Packet Delay Budget. The SL traffic's QoS being higher than the threshold indicates that the SL priority is higher than the UL priority.

In another example, considering that the SL traffic can be further divided into LTE V2X and NR V2X, if LTE V2X traffic and NR V2X traffic are overlapped, and while SL has a higher priority level for transmission, then the UE should compare the QoS of LTE V2X and NR V2X.

In yet another example, the gNB can configure an inter-RAT QoS priority list, to indicate the overall QoS priority level for both NR V2X and LTE V2X.

5) Prioritization rule if the gap is configured for crossing RAT frequency. Herein, the UE could decide its transmission and reception based on one of the following priority lists:
   a) Uu transmission/reception for RACH
   b) Inter-RAT V2X for transmission
   c) Non-RACH Uu transmission/intra-RAT V2X transmission
   d) Inter-RAT V2X for reception
   e) Non-RACH Uu reception/intra-RAT V2X reception In some embodiments, the inter-RAT and intra-RAT is compared with the RAT that is used for random access.

In other embodiments, the Non-RACH Uu transmission and intra-RAT V2X transmission, as well as Non-RACH Uu reception and intra-RAT V2X reception, should follow the SL and UL prioritization.

In yet other embodiments, the gNB can configure a threshold for SL QoS and/or Packet Priority Level and/or Packet Delay Budget. Herein, when the SL traffic's QoS is higher than a threshold, then the SL priority is higher than UL priority.

In some embodiments, and for NR V2X, the gNB can configure multiple resource types for the UE, including an LTE SL resource configuration. For configured grant type 1, the configuration can include periodicity, timing offset, time-domain resource location, frequency-domain resource location, antenna port, MCS, TB Size, Tx resource pool, V-CS-RNTI, is_sensing_enabled, and allowed QoS index/VQI/PDB list. For configured grant type 2, the configuration can include periodicity, Tx resource pool, V-CS-RNTI, allowed QoS index/priority/VQI/PDB list. For a scheduled resource, the configuration can include V-RNTI, MCS, Tx resource pool (e.g., sync, SCS), a mapping between LCG and allowed QoS index/priority/VQI/PDB/SCS, allowed QoS index/VQI/PDB list. For mode 2a resources, the configuration can include Tx resource pools, sensing configuration, CBR-Priority for Tx parameter config, allowed QoS index/VQI/PDB list. For mode 2d resources, the configuration can include IsMode2d allowed.

In some embodiments, the following additional configuration can be supported:
- Inter-carrier resource configuration
- PC5 carrier selection relevant configuration
- PDCP duplication relevant configuration
- LTE SL resource configuration
- V2X related system information update Another embodiment of the presently disclosed technology may be described as:

The method 610 includes, at step 614, receiving, from the network node, a dedicated resource. The method 610 includes, at step 616, performing, using the dedicated resource, a device-to-device link communication.

Some embodiments and techniques related to methods 600 and 610 may be described using the following clause-based description.

1. A method for wireless communication, comprising receiving, by a wireless device from a network node, a configuration for multiple resource pools that are associated with a carrier set; selecting, based on the configuration, a resource from the multiple resource pools; and performing, using the resource, a device-to-device link communication.

```
SidelinkUEInformation-v1600-IEs ::= SEQUENCE {
v2x-CommRxInterestedFreqList SL-V2X-CommFreqList OPTIONAL,
p2x-CommTxType ENUMERATED {true} OPTIONAL,
ue-SL-Identity ::= BIT STRING (SIZE (24)),
      qos_Indicatorlist        ::= SEQUENCE (0.. maxQOS) OF CHOICE {
standard_vqi INTEGER (0..255),
dynamic_vqi            ::= SEQUENCE {
            priority_level,
pdb,
            Per/reliability_level,
            delay_ciritical,
            Average_window,
            Maximum_data_burst_volume
      }
      Legacy_QoS         ::= SEQUENCE{
        PPPP,
        PPPR,
      }
},
v2x-CommTxResourceReq ::= SEQUENCE {
     sl-DestinationIdentity ::= BIT STRING (SIZE (24)),
     commType              ENUMERATED {unicast, groupcast, broadcast} OPTIONAL,
     ueType                ENUMERATED {header, member}, -- COND groupcast
     ratType               ENUMERATED {R15LTE, R14LTE,NR, LTEorNR, LTEandNR},
     resourceType          ENUMERATED { } OPTIONAL,
trafficPatternInfoList ::= SEQUENCE (SIZE (1..maxTrafficPattern-r14)) OF SEQUENCE {
    isPeriodical                       BOOLEAN;
        trafficPeriodicity-r14 ENUMERATED {sf20, sf50, sf100, sf200, sf300, sf400,
sf500,sf600, sf700, sf800, sf900, sf1000}OPTIONAL,
        timingOffset-r14 INTEGER (0..10239) OPTIONAL,
        qos_indicator_index,
        logicalChannelIdentityUL-r14 INTEGER (3..10) OPTIONAL,
        messageSize-r14 BIT STRING (SIZE (6)) OPTIONAL,
}
     carrierFreqCommTxList :: = SEQUENCE (SIZE (1..maxFreq)) OF SEQUENCE {
     carrierFreqCommTx INTEGER (0.. maxFreqV2X-1) OPTIONAL,
     v2x-TypeTxSync ENUMERATED {gnss, enb, gnb, ue} OPTIONAL,
      }
} OPTIONAL,
nonCriticalExtension SidelinkUEInformation-v1530-IEs OPTIONAL
}
```

Exemplary Methods for the Disclosed Technology

Figure 6A:
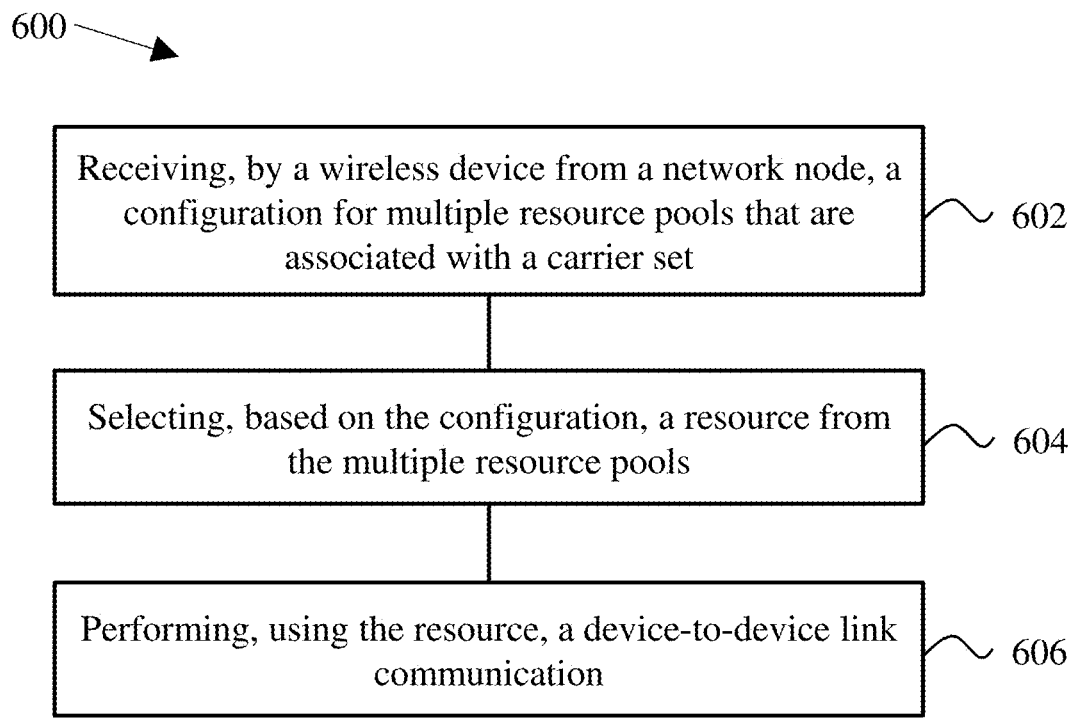

FIG. 6A shows an example of a wireless communication method 600 for resource configuration and selection for device-to-device links in mobile communication technology. The method 600 includes, at step 602, receiving, by a wireless device from a network node, a configuration for multiple resource pools that are associated with a carrier set.

The method 600 includes, at step 604, selecting, based on the configuration, a resource from the multiple resource pools. The method 600 includes, at step 606, performing, using the resource, a device-to-device link communication.

FIG. 6B shows another example of a wireless communication method 610 for resource configuration and selection for device-to-device links in mobile communication technology. The method 610 includes, at step 612, receiving, by a wireless device from a network node, a configuration for multiple resource pools that are associated with a carrier set.

2. A method for wireless communication, comprising receiving, by a wireless device from a network node, a configuration for multiple resource pools that are associated with a carrier set; receiving, from the network node, a dedicated resource; and performing, using the dedicated resource, a device-to-device link communication.

3. A method of clause 1 or 2, comprising transmitting, by the wireless device to the network node, a resource configuration request that is associated with the wireless device itself.

4. The method of clause 3, wherein the configuration comprises at least one of a UE ID, a quality-of-service (QoS) list of ongoing services, an interested frequency list for reception, an interested frequency list for transmission, a UE type, a Radio Access Technology (RAT) type that the wireless device is enabled to use for transmission, a resource type, an indication of whether traffic is periodic, a traffic periodicity, a logical channel identity for UL transmission or a traffic pattern.

5. The method of clause 3, wherein the configuration comprises a UE ID.

6. The method of clause 3, wherein the configuration comprises a quality-of-service (QoS) list of ongoing services.

7. The method of clause 3, wherein the configuration comprises an interested frequency list for reception.

8. The method of clause 3, wherein the configuration comprises an interested frequency list for transmission.

9. The method of clause 3, wherein the configuration comprises a UE type.

10. The method of clause 3, wherein the configuration comprises a Radio Access Technology (RAT) type that the wireless device is enabled to use for transmission.

11. The method of clause 3, wherein the configuration comprises a resource type.

12. The method of clause 3, wherein the configuration comprises an indication of whether traffic is periodic.

13. The method of clause 3, wherein the configuration comprises a traffic periodicity.

14. The method of clause 3, wherein the configuration comprises a logical channel identity for UL transmission or a traffic pattern.

15. The method of clause 3, wherein the configuration comprises a traffic pattern.

16. The method of clause 1 or 2, wherein the configuration comprises at least one of a set of allowed carriers used for device-to-device link communication for NR RAT, a set of allowed carriers used for device-to-device link communication for LTE RAT, a transmission parameter associated with a different packet priority, a synchronization resource type for each carrier, a resource pool configuration, a mapping between a logical channel group and a QoS index, a mapping between data rates and different numbers of sub-channels, a packet duplication threshold associated with a packet error rate, a mapping between a scheduling mode and a QoS index, an SL-CS-RNTI associated with a configured grant type 1, an SL-CS-RNTI associated with a configured grant type 2, or a mapping between VQI and a corresponding PDCP, RLC or MAC parameter.

17. The method of clause 1 or 2, wherein the configuration comprises a set of allowed carriers used for device-to-device link communication for NR RAT.

18. The method of clause 1 or 2, wherein the configuration comprises a set of allowed carriers used for device-to-device link communication for LTE RAT.

19. The method of clause 1 or 2, wherein the configuration comprises a transmission parameter associated with a different packet priority.

20. The method of clause 1 or 2, wherein the configuration comprises a synchronization resource type for each carrier.

21. The method of clause 1 or 2, wherein the configuration comprises a resource pool configuration.

22. The method of clause 1 or 2, wherein the configuration comprises a mapping between a logical channel group and a QoS index.

23. The method of clause 1 or 2, wherein the configuration comprises a mapping between data rates and different numbers of sub-channels.

24. The method of clause 1 or 2, wherein the configuration comprises a packet duplication threshold associated with a packet error rate.

25. The method of clause 1 or 2, wherein the configuration comprises a mapping between a scheduling mode and a QoS index.

26. The method of clause 1 or 2, wherein the configuration comprises an SL-CS-RNTI associated with a configured grant type 1.

27. The method of clause 1 or 2, wherein the configuration comprises an SL-CS-RNTI associated with a configured grant type 2.

28. The method of clause 1 or 2, wherein the configuration comprises a mapping between VQI and a corresponding PDCP, RLC or MAC parameter.

29. The method of clause 16 or 28, wherein the corresponding PDCP parameter includes at least one of discardTimer, statusReportRequired, PDCP-SN-Size, DataSplitThreshold, statusPDB-Periodicity, t-Reordering, rn-IntegrityProtection, DataSplitDRB, DataSplitThreshold, outofOrderDelivery or pdcp-DuplicationSRB.

30. The method of clause 16 or 28, wherein the corresponding RLC parameter includes at least one of t-PollRetransmit, pollPDU, pollByte, maxRetxThreshold, t-Reordering, t-StatusProhibit, am-WithShortSN, um-WithShortSN or um-WithLongSN.

31. The method of clause 16 or 28, wherein the corresponding MAC parameter includes at least one of LCP-Restriction, recommendedBitRate, logicalChannelSR-DelayTimer, multipleSR-Configurations or multipleConfiguredGrants.

32. The method of clause 16, wherein the transmission parameter associated with the different packet priority comprises at least one of a range of applicable modulation and coding schemes (MCS), a range of applicable number of sub-channels, a number of re-transmissions, or an allowed maximum transmission power.

33. The method of any of clauses 16 to 28, wherein the transmission parameter associated with the different packet priority comprises a range of applicable modulation and coding schemes (MCS).

34. The method of any of clauses 16 to 28, wherein the transmission parameter associated with the different packet priority comprises a range of applicable number of sub-channels.

35. The method of any of clauses 16 to 28, wherein the transmission parameter associated with the different packet priority comprises a number of re-transmissions.

36. The method of any of clauses 16 to 28, wherein the transmission parameter associated with the different packet priority comprises an allowed maximum transmission power.

37. The method of clause 16, wherein the resource pool configuration comprises at least one of a resource type, a resource periodicity, a resource timing offset, a time-domain resource location, a frequency-domain resource location, an antenna port configuration of the resource, or an indication of whether a current resource pool is allowed for sensing.

38. The method of any of clauses 16 to 28, wherein the resource pool configuration comprises a resource type.

39. The method of any of clauses 16 to 28, wherein the resource pool configuration comprises a resource periodicity.

40. The method of any of clauses 16 to 28, wherein the resource pool configuration comprises a resource timing offset.

41. The method of any of clauses 16 to 28, wherein the resource pool configuration comprises a time-domain resource location.

42. The method of any of clauses 16 to 28, wherein the resource pool configuration comprises a frequency-domain resource location.

43. The method of any of clauses 16 to 28, wherein the resource pool configuration comprises an antenna port configuration of the resource.

44. The method of any of clauses 16 to 28, wherein the resource pool configuration comprises an indication of whether a current resource pool is allowed for sensing.

45. The method of clause 4 or 37, wherein the resource type comprises at least one of an NR configured grant type 1, an NR configured grant type 2, a mode 1 resource, a mode 2 resource, a dynamic resource, or an SPS resource.

46. The method of clause 1 or 2, wherein selecting the resource from the multiple resource pools is further based on an amount of buffered data for at least one carrier in the carrier set.

47. The method of clause 16, wherein selecting the resource with a certain number of sub-channel is based on the configured mapping between the data rate to the number of sub-channels.

48. The method of clause 1, wherein the communication is enabled to support a specific casting type.

49. The method of clause 48, wherein the specific casting type is groupcast, wherein the wireless device is a header user equipment (UE) for a plurality of UEs.

50. The method of clause 49, further comprising receiving, from the network node, a configuration for a resource configuration from the multiple resource pools; and transmitting the resource configuration to the plurality of UEs.

51. The method of clause 49, further comprising reporting, to the network node, an assistance information for a resource request that is used for device-to-device communication between itself and the plurality of UEs.

52. The method of clause 50, the assistance information comprises at least one of a CBR measurement on each selected carrier, a QoS requirement of the groupcast service, a band combination capability of the wireless device and the plurality of UEs, or a number of UEs within this group.

53. The method of clause 50, the assistance information comprises a CBR measurement on each selected carrier.

54. The method of clause 50, the assistance information comprises a QoS requirement of the groupcast service.

55. The method of clause 50, the assistance information comprises a band combination capability of the wireless device and the plurality of UEs.

56. The method of clause 50, the assistance information comprises a number of UEs within this group.

57. The method of clause 48, further comprising determining a plurality of locations for each of the plurality of UEs; and selecting, based on the plurality of locations and a plurality of signal strengths, a set of beam directions that are used for the transmitting the configuration and data traffic, wherein each of the plurality of signal strengths is associated with a specific beam direction.

58. The method of clause 49 or 50, wherein the configuration comprises at least one of an identification of the header user equipment that is enabled to provide the multiple resource pools, a time-domain indication of a location of the resource, a frequency-domain indication of a location of the resource, transmission parameters.

59. The method of clause 49 or 50, wherein the configuration comprises an identification of the header user equipment that is enabled to provide the multiple resource pools.

60. The method of clause 49 or 50, wherein the configuration comprises a time-domain indication of a location of the resource.

61. The method of clause 49 or 50, wherein the configuration comprises a frequency-domain indication of a location of the resource.

62. The method of clause 49 or 50, wherein the configuration comprises transmission parameters.

63. The method of clause 58, wherein the transmission parameters includes at least one of a range of applicable MCS, a range of applicable number of sub-channels, a number of re-transmissions, or an allowed maximum transmission power.

64. The method of clause 3 or 49, wherein the reported information comprises the resource configuration, and wherein the header UE is enabled to transmit the reported information to the plurality of UEs.

65. The method of clause 48, further comprising selecting a mode 2 resource from the multiple resource pools; and transmitting a configuration for the mode 2 resource to the plurality of UEs.

66. The method of clause 50 or 65, wherein the configuration is transmitted over a PC5 Radio Resource Control (RRC) connection.

67. The method of clause 2, wherein the resource pool is a mode 1 resource pool, and wherein selecting the resource is further based on an indication from the network node.

68. The method of clause 1, wherein the resource pool is a mode 2 resource pool, and wherein selecting the resource is performed autonomously by the wireless device.

69. The method of clause 1 or 2, wherein a configuration for the multiple resource pools comprises at least one of a resource periodicity, a resource timing offset, a resource location in a time-domain, a resource location in a frequency-domain, an antenna port configuration of the resource or an allowed modulation and coding scheme (MCS) range when using the resource.

70. The method of clause 1 or 2, wherein a configuration for the multiple resource pools comprises a resource periodicity.

71. The method of clause 1 or 2, wherein a configuration for the multiple resource pools comprises a resource timing offset.

72. The method of clause 1 or 2, wherein a configuration for the multiple resource pools comprises a resource location in a time-domain.

73. The method of clause 1 or 2, wherein a configuration for the multiple resource pools comprises a resource location in a frequency-domain.

74. The method of clause 1 or 2, wherein a configuration for the multiple resource pools comprises an antenna port configuration of the resource.

75. The method of clause 1 or 2, wherein a configuration for the multiple resource pools comprises an allowed modulation and coding scheme (MCS) range when using the resource.

76. The method of clause 1, further comprising associating at least one carrier of the carrier set to a logical channel.

77. The method of clause 7 or 69, wherein a casting type can be associated to each logical channel, and wherein the casting type is unicast, groupcast or broadcast.

78. The method of clause 69, wherein the configuration comprises a mapping between the logical channel and at least one quality-of-service (QoS) index.

79. The method of clause 1, wherein the resource comprises a device-to-device resource or an uplink (UL) resource.

80. The method of clause 79, wherein the device-to-device resource is a New Radio (NR) sidelink (SL) grant, and wherein the uplink resource is an NR UL grant.

81. The method of clause 80, wherein the wireless device is enabled to select between the NR SL grant and the NR UL grant based on comparing a priority of an SL Medium Access Control (MAC) Protocol Data Unit (PDU) to a priority of a UL MAC PDU.

82. The method of clause 80, wherein the wireless device is enabled to select between the NR SL grant and the NR UL grant based on an SL logical channel (LCH) priority threshold that is configured by the network node.

83. The method of clause 82, wherein the wireless device is enabled to select between the NR SL grant and the NR UL grant based on a PC5 QFI (Quality-of-Service Flow ID) list that is configured by the network node.

84. The method of clause 80, wherein the device-to-device resource is a Long Term Evolution (LTE) sidelink (SL) grant, and wherein the uplink resource is a New Radio (NR) UL grant.

85. The method of clause 84, wherein the wireless device is enabled to select between the LTE SL grant and the NR UL grant by comparing priority thresholds.

86. The method of clause 1 or 2, wherein selecting the resource is further based on at least one of a specific transmission profile, a scheduling mode or a determination of whether the resource is a configured grant type 1 or a configured grant type 2.

87. The method of clause 2, wherein the resource is a configured grant type 2, and wherein the method further comprises receiving, from the network node, an activation or deactivation of the resource; and transmitting a device-to-device configured grant confirmation medium access control (MAC) control element (CE) that includes a corresponding logical channel ID (LCID) or one or more configured grant type 2 indexes.

88. The method of clause 1, wherein the configuration comprises a mapping between VQI and a corresponding PDCP/RLC/MAC parameter.

89. The method of clause 1, wherein the device-to-device link is a sidelink (SL), wherein selecting the resource comprises selecting between a mode 1 SL transmission and a mode 2 SL transmission.

90. The method of clause 89, wherein selecting between the mode 1 SL transmission and the mode 2 SL transmission is based on an explicit indication from the network node.

91. The method of clause 89, wherein the network node configures a 5QI/VQI/QoS index list for mode 2, and wherein selecting between the mode 1 SL transmission and the mode 2 SL transmission is based on a mode 2 SL MAC PDU comprising 5QI data of the 5QI/VQI/QoS index list for mode 2.

92. The method of clause 1, wherein the device-to-device link is a sidelink (SL), wherein a gap for a frequency switch is not configured, wherein the network node configures a threshold for SL quality-of-service (QoS), Packet Priority Level or Packet Delay Budget, and wherein selecting the resource comprises selecting between SL LTE V2X traffic and SL NR V2X traffic.

93. The method of clause 92, wherein the selecting is further based on comparing a QoS of the SL LTE V2X traffic and a QoS of the SL NR V2X traffic.

94. The method of clause 1, wherein the device-to-device link is a sidelink (SL), wherein a gap for crossing a Radio Access Technology (RAT) frequency is configured, and wherein selecting the resource is further based on a priority list that includes (i) Uu transmission or reception for RACH, (ii) Inter-RAT V2X for transmission, (iii) Non-RACH Uu transmission or intra-RAT V2X transmission, (iv) Inter-RAT V2X for reception, and (v) Non-RACH Uu reception or intra-RAT V2X reception.

Implementations for the Disclosed Technology

FIG. 7 is a block diagram representation of a portion of an apparatus, in accordance with some embodiments of the presently disclosed technology. An apparatus 705, such as a base station or a wireless device (or UE), can include processor electronics 710 such as a microprocessor that implements one or more of the techniques presented in this document. The apparatus 705 can include transceiver electronics 715 to send and/or receive wireless signals over one or more communication interfaces such as antenna(s) 720. The apparatus 705 can include other communication interfaces for transmitting and receiving data. Apparatus 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the apparatus 705.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
receiving, by a wireless device from a network node, a configuration for multiple resource pools that are configured on a carrier set, wherein the wireless device is enabled to support groupcasting, and wherein the wireless device is a header user equipment (UE) for a group of UEs that includes a plurality of member UEs;
receiving, by the wireless device from the network node, a configuration for a resource pool of the multiple resource pools;
transmitting, by the header UE, the configuration for the resource pool to the plurality of member UEs;
selecting, based on the configuration for the resource pool, a resource from the resource pool; and
performing, using the resource, a device-to-device link communication.

2. A method for wireless communication, comprising:
receiving, by a wireless device from a network node, a configuration for multiple resource pools that are associated with a carrier set;
selecting, based on the configuration, a resource from the multiple resource pools; and
performing, using the resource, a device-to-device link communication,
wherein the configuration for multiple resource pools comprises at least one of: a set of allowed carriers used for device-to-device link communication for New Radio (NR) Radio Access Technology (RAT), a set of allowed carriers used for device-to-device link communication for LTE RAT, a transmission parameter associated with a different packet priority, a synchronization resource type for each carrier, a mapping between a logical channel group and a Quality-of-Service (QOS) index, a mapping between data rates and different numbers of sub-channels, a packet duplication threshold associated with a packet error rate, a mapping between a scheduling mode and a QoS index, a sidelink (SL) configured scheduling (CS) RNTI (SL-CS-RNTI) associated with a configured grant type 1, an SL-CS-RNTI associated with a configured grant type 2, or a mapping between virtual queue index (VQI) and a corresponding Packet Data Convergence Protocol (PDCP) parameter, a corresponding Radio Link Control (RLC) parameter, or a corresponding Media Access Control (MAC) parameter.

3. The method of claim 2, wherein:
(1) the corresponding PDCP parameter includes at least one of discard Timer, statusReportRequired, PDCP Sequence Number Size (PDCP-SN-Size), DataSplit-Threshold, t-Reordering, rn-IntegrityProtection, DataSplitDRB (Data Radio Bearer), DataSplitThreshold, outofOrderDelivery or pdcp-DuplicationSRB (Signaling Radio Bearer);
(2) the corresponding RLC parameter includes at least one of t-PollRetransmit, pollPDU, pollByte, maxRetxThreshold, t-Reordering, t-StatusProhibit, am-WithShortSN, um-WithShortSN or um-WithLongSN;
(3) the corresponding MAC parameter includes at least one of Logical Channel Prioritization (LCP)-Restriction, recommendedBitRate, logicalChannelSR-DelayTimer, multipleSR-Configurations or multipleConfiguredGrants; or
(4) the transmission parameter associated with the different packet priority comprises at least one of: a range of applicable modulation and coding schemes (MCS), a range of applicable number of sub-channels, a number of re-transmissions, or an allowed maximum transmission power.

4. The method of claim 1, wherein selecting the resource from the multiple resource pools is based on at least one of:
an amount of buffered data for at least one carrier in the carrier set;
an autonomous selection by the wireless device, wherein the resource pool is a mode 2 resource pool;
a specific transmission profile;
a scheduling mode; or
a determination of whether the resource is a configured grant type 1 or a configured grant type 2.

5. The method of claim 1, further comprising:
reporting, to the network node, an assistance information for a resource request that is used for the device-to-device link communication between the wireless device and the plurality of member UEs, wherein the assistance information comprises at least one of: a Channel Busy Ratio (CBR) measurement on each selected carrier, a QoS requirement of a groupcast service, a band combination capability of the wireless device and the plurality of member UEs, or a number of UEs within the plurality of UEs.

6. The method of claim 1, further comprising:
determining a plurality of locations for each of the plurality of member UEs; and
selecting, based on the plurality of locations and a plurality of signal strengths, a set of beam directions that are used for the transmitting the configuration for the resource pool and data traffic, wherein each of the plurality of signal strengths is associated with a specific beam direction.

7. The method of claim 1, wherein the configuration for the multiple resource pools comprises at least one of: a resource periodicity of the resource, a resource timing offset of the resource, a resource location in a time-domain of the resource, a resource location in a frequency-domain of the resource, an antenna port configuration of the resource, an allowed modulation and coding scheme (MCS) range when using the resource.

8. The method of claim 1, wherein the device-to-device link is a sidelink (SL), and wherein selecting the resource comprises selecting between a mode 1 SL transmission and a mode 2 SL transmission based on at least one of:
 an explicit indication from the network node; or
 a mode 2 SL MAC PDU comprising 5G QoS Identifier (5QI) data of a 5QI, VQI, or QoS index list.

9. The method of claim 1, wherein the device-to-device link is a sidelink (SL), and wherein:
 1) a gap for a frequency switch is not configured, a threshold for SL quality-of-service (QoS), Packet Priority Level or Packet Delay Budget is configured, and selecting the resource comprises selecting between SL LTE V2X traffic and SL NR V2X traffic; or
 2) a gap for crossing a Radio Access Technology (RAT) frequency is configured, and selecting the resource is based on a priority list that includes: (i) a Uu transmission or reception for Random-Access Channel (RACH), (ii) an Inter-RAT V2X for transmission, (iii) a Non-RACH Uu transmission or the intra-RAT V2X for transmission, (iv) an Inter-RAT V2X for reception, and (v) the Non-RACH Uu reception or the intra-RAT V2X reception.

10. A method for wireless communication, comprising:
 receiving, by a wireless device from a network node, a configuration for multiple resource pools that are associated with a carrier set;
 receiving, from the network node, a dedicated resource, wherein the dedicated resource is a configured grant type 2;
 receiving, from the network node, an activation or deactivation of the resource; and
 transmitting a device-to-device configured grant confirmation medium access control (MAC) control element (CE) that includes a corresponding logical channel ID (LCID) or one or more configured grant type 2 indexes; and
 performing, using the dedicated resource, a device-to-device link communication.

11. A wireless communications apparatus comprising a processor and a memory storing instructions, which when executed by the processor, causes the apparatus to:
 receive, from a network node, a configuration for multiple resource pools that are configured on a carrier set, wherein the apparatus is enabled to support groupcasting, wherein the apparatus is a header user equipment (UE) for group of UEs that includes for a plurality of member UEs;
 receive, by the apparatus from the network node, a configuration for a resource pool of the multiple resource pools; and
 transmit, by the header UE, the configuration for the resource pool to the plurality of member UEs
 select, based on the configuration, a resource from the multiple resource pools; and
 perform, using the resource, a device-to-device link communication.

12. The apparatus of claim 11, wherein the resource from the multiple resource pools is selected based on at least one of:
 an amount of buffered data for at least one carrier in the carrier set;
 an autonomous selection by the wireless device, wherein the resource pool is a mode 2 resource pool;
 a specific transmission profile;
 a scheduling mode; or
 a determination of whether the resource is a configured grant type 1 or a configured grant type 2.

13. The apparatus of claim 11, further caused to:
 report, to the network node, an assistance information for a resource request that is used for the device-to-device link communication between the apparatus and the plurality of member UEs, wherein the assistance information comprises at least one of: a CBR measurement on each selected carrier, a QoS requirement of a groupcast service, a band combination capability of the wireless device and the plurality of member UEs, or a number of UEs within the plurality of UEs.

14. The apparatus of claim 11, wherein the apparatus is further caused to:
 determine a plurality of locations for each of the plurality of member UEs; and
 selecting, based on the plurality of locations and a plurality of signal strengths, a set of beam directions that are used for the transmitting the configuration for the resource pool and data traffic, wherein each of the plurality of signal strengths is associated with a specific beam direction.

15. The apparatus of claim 11, wherein the configuration for the multiple resource pools comprises at least one of: a resource periodicity of the resource, a resource timing offset of the resource, a resource location in a time-domain of the resource, a resource location in a frequency-domain of the resource, an antenna port configuration of the resource, an allowed modulation and coding scheme (MCS) range when using the resource.

16. The apparatus of claim 11, wherein the device-to-device link is a sidelink (SL), and wherein selecting the resource comprises selecting between a mode 1 SL transmission and a mode 2 SL transmission based on at least one of:
 an explicit indication from the network node; or
 a mode 2 SL MAC PDU comprising 5QI data of a 5QI, VQI, or QoS index list.

17. The apparatus of claim 11, wherein the device-to-device link is a sidelink (SL), and wherein:
 1) a gap for a frequency switch is not configured, a threshold for SL quality-of-service (QOS), Packet Priority Level or Packet Delay Budget is configured, and selecting the resource comprises selecting between SL LTE V2X traffic and SL NR V2X traffic; or
 2) a gap for crossing a Radio Access Technology (RAT) frequency is configured, and selecting the resource is based on a priority list that includes: (i) a Uu transmission or reception for RACH, (ii) an Inter-RAT V2X for transmission, (iii) a Non-RACH Uu transmission or the intra-RAT V2X for transmission, (iv) an Inter-RAT V2X for reception, and (v) the Non-RACH Uu reception or the intra-RAT V2X reception.

* * * * *